(12) United States Patent
Williams et al.

(10) Patent No.: US 7,823,909 B2
(45) Date of Patent: Nov. 2, 2010

(54) HIGH STRENGTH AIRBAG ATTACHMENT FOR USE WITH FLANGED INFLATORS

(75) Inventors: Jeffrey Daniel Williams, Roy, UT (US); Larry Rose, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 156 days.

(21) Appl. No.: 11/974,579

(22) Filed: Oct. 15, 2007

(65) Prior Publication Data

US 2009/0096191 A1    Apr. 16, 2009

(51) Int. Cl.
B60R 21/203    (2006.01)
B60R 21/205    (2006.01)

(52) U.S. Cl. ............... 280/728.2; 280/731; 280/732

(58) Field of Classification Search ........... 280/728.2, 280/731, 732, 728.1, 743.1
See application file for complete search history.

(56) References Cited

U.S. PATENT DOCUMENTS

| | | |
|---|---|---|
| 4,183,550 A | 1/1980 | Sudou |
| 5,226,671 A | 7/1993 | Hill |
| 5,393,092 A | 2/1995 | Charns et al. |
| 5,443,284 A | 8/1995 | Strahl et al. |
| 5,509,685 A | 4/1996 | Boyle, III |
| 5,542,692 A * | 8/1996 | Shaklik et al. ........... 280/728.2 |
| 5,613,700 A * | 3/1997 | Hiramitsu et al. ........ 280/728.2 |
| 5,642,900 A | 7/1997 | Patel |
| 5,860,672 A | 1/1999 | Petersen |
| 6,877,765 B2 | 4/2005 | Rose et al. |

* cited by examiner

Primary Examiner—Paul N Dickson
Assistant Examiner—Keith Frisby
(74) Attorney, Agent, or Firm—Sally J Brown; Madson IP, P.C.

(57) ABSTRACT

An airbag module includes an inflator and an airbag housed within a housing. The airbag has a cushion inflator hub portion that includes one or more tab extensions and an opening. The tab extensions define at least a portion of the periphery of the opening. A retainer ring is also added to the airbag module. The retainer ring has an aperture through which the inflator may be passed. The retainer ring includes one or more relief cuts positioned to receive the tab extensions. Specifically, the tab extensions are bent to pass through the relief cuts.

14 Claims, 3 Drawing Sheets

HIGH STRENGTH AIRBAG ATTACHMENT FOR USE WITH FLANGED INFLATORS

BACKGROUND OF THE INVENTION

Frontal airbag systems are known in the industry and are standard on all new motor vehicles. These frontal airbag systems may be drivers' airbags or passenger airbags (which are usually positioned in the dashboard of the vehicle).

It is known that the frontal airbag system includes an airbag that is held within a housing. A retainer ring is also added to the system. Specifically, the airbag is generally clamped between the retainer ring and the housing to secure the airbag in position and to anchor it during deployment. Once positioned, fasteners are added to permanently affix the airbag. Obviously, it is important that the retainer ring and housing adequately retain and hold the airbag in position, even during the deployment. Deployment of an airbag often places large loads on the fasteners and the retainer ring. Accordingly, care must be taken to ensure that the fasteners/retainer ring can withstand this load over the lifespan of the airbag system.

Over the lifespan of the airbag system, the fasteners joints can have a tendency to relax and loosen. Similarly, there has been a recent trend in the airbag industry to use plastic materials in constructing the airbag housing. These changes create the possibility that the fasteners will loosen over time and will not be sufficiently tight to withstand the large loads created during deployment. Accordingly, in order to combat the possibility that the fasteners will loosen over time, the torque applied to the fasteners during assembly is often quite high.

Of course, applying extra torque to the fasteners makes the airbag assembly process more complex and more expensive. Similarly, the quality control inspections for these airbag units become more costly and difficult as inspectors must take sufficient steps to ensure that the fasteners have received the proper amount of torque. Accordingly, the costs of producing and installing airbag systems have been significantly increased.

Similarly, there is also a trend in the airbag industry to make airbag systems smaller and more compact. In order to make the airbag systems smaller, the size of the airbag housing must similarly be reduced. Likewise, the size of the inflator that is used with these smaller airbag systems is also decreased. The fasteners that secure the airbag pass through holes that are located on the airbag. However, as the size of the airbag decreases (to fit into the smaller housing), the fastener holes for the airbag assembly are now positioned nearer to the edge of the fabric. If the fastener holes are too close to the edge of the fabric, there is a possibility that the fasteners will undesirably pull or rip through the fabric during deployment.

Accordingly, there is a need in the industry for a new type of airbag attachment and retaining ring that addresses one or more of the above-recited problems. Such a device is disclosed herein.

BRIEF SUMMARY OF THE INVENTION

An airbag module with an inflator is disclosed. The airbag module comprises an airbag housed within an airbag housing. The airbag comprises a cushion inflator hub portion, wherein the cushion inflator hub portion includes one or more tab extensions and an opening. The tab extensions define at least a portion of the periphery of the opening. The airbag module also includes a retainer ring having a central aperture through which the inflator may be passed. The retainer ring comprises one or more relief cuts positioned to receive the tab extensions when the tab extensions are bent to pass through the relief cuts.

In some embodiments, the opening is sized so that, when the extensions are bent, a circular inflator may be passed through the opening. The opening may have the shape of a modified formée cross. In other embodiments, a stitchline that circumscribes the opening may be added to the airbag module. The stitchline may further comprise a circular loop on one or more of the tab extensions. The retainer ring may have a generally rectangular shape and a fastener hole is added proximate each of the corners of the retainer ring. One or more cushion fastening holes may be added to the cushion inflator huh portion of the airbag to align with the fastener holes. The tab extensions may be positioned between the holes and the opening. In other embodiments, a tab extension may be positioned proximate a cushion fastening hole, sometimes also called a stud hole.

The present embodiments also relate to an attachment mechanism for an airbag comprising a cushion inflator hub portion, wherein the cushion inflator hub portion includes one or more tab extensions and an opening, each tab extension defining at least a portion of the periphery of the opening. The attachment mechanism also includes a retainer ring having a central aperture, the retainer ring comprising one or more relief cuts positioned to receive the tab extensions when the tab extensions are bent to pass through the relief cuts.

The present embodiments also teach a method for reinforcing an airbag module with reduced torque on the fasteners. This method comprises the step of obtaining an inflator and an airbag housed within a housing. The airbag comprises a cushion inflator hub portion, wherein the cushion inflator hub portion includes one or more tab extensions and an opening, the tab extension defining at least a portion of the periphery of the opening. The method also includes the step of obtaining a retainer ring, the retainer ring having a central aperture, wherein the retainer ring comprises one or more relief cuts. Additionally, the method includes the step of bending the tab extensions such that the tab extensions pass through the relief cuts.

The present embodiments relate to an airbag module that may be used in a frontal airbag system. The airbag is housed within a housing. The airbag is also used with an inflator. The inflator is designed to produce and/or channel a large quantity of inflation gas into the airbag in the event of an accident or crash. This inflation gas operates to inflate the airbag such that the inflated airbag becomes positioned within the vehicle interior.

The airbag will include a cushion inflator hub portion (which may be referred to as a "hub portion" for convenience). This hub portion is a portion or section of the airbag that is designed to be attached/secured to the inflator and/or the airbag housing.

The hub portion includes an opening. The opening is an aperture in the hub portion that is sized and configured such that it will match (or be slightly larger than) the diameter of the inflator. The hub portion includes one or more tab extensions that extend inward into the opening. (The tab extensions may also be referred to as simply "extensions"). These extensions are portions of the fabric of the airbag that were not cut out in forming the opening. The extensions may be generally square or rectangular in shape so as to resemble tabs, although other shapes may be suitable.

The hub portion may further include one or more cushion fastening holes. These cushion fastening holes are designed to receive a fastener (such as a screw, bolt, etc.). As is known in the art, fasteners are used to secure the airbag to a housing and/or inflator during the assembly process. In other words, the fasteners will pass through the cushion fastening holes as a means of securing the airbag.

A stitchline may also be added to the hub portion. The stitchline is a sew line that may be used to reinforce/strengthen the hub portion. In some embodiments, the stitchline also may include loops that are positioned on the extensions. The loops, extensions, and stitchline may operate to increase the strength/robustness of the hub portion and reduce the likelihood that fasteners will rip or tear through the cushion fastening holes during deployment of the airbag.

A retainer ring is also used in conjunction with the airbag. The retainer ring is designed to engage and/or retain the hub portion. The retainer ring may be rectangular or square in shape. Other shapes may also be suitable. The retainer ring may include one or more fastener holes that are designed to secure the retainer ring to the airbag, the inflator, and/or other portions of the airbag module. The fastener holes may be positioned proximate the corners of the retainer ring. The retainer ring includes a central aperture that is sized to receive an inflator. Specifically, the central aperture is a hole or opening in the retainer ring through which an inflator may be passed.

The retainer ring further includes one or more relief cuts. The relief cuts are cuts, incisions, or other "cut-out" portions of the aperture that makes the aperture have a larger diameter/size at the location of the cuts. The cuts are designed such that when the airbag module is fully assembled, the position of the cuts corresponds to the position of the extensions on the hub portion. In some embodiments, this may involve positioning the relief cuts proximate to the corners.

The airbag module is designed such that the central aperture of the retainer ring is designed such that a portion of the inflator may pass through the central aperture. Similarly, the opening in the hub portion is also designed such that, when the extensions are folded, a portion of the inflator may pass through the opening. The extensions are bent such that they protrude through the relief cuts. The relief cuts in the ring allow for this bending of the extensions to occur easily.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
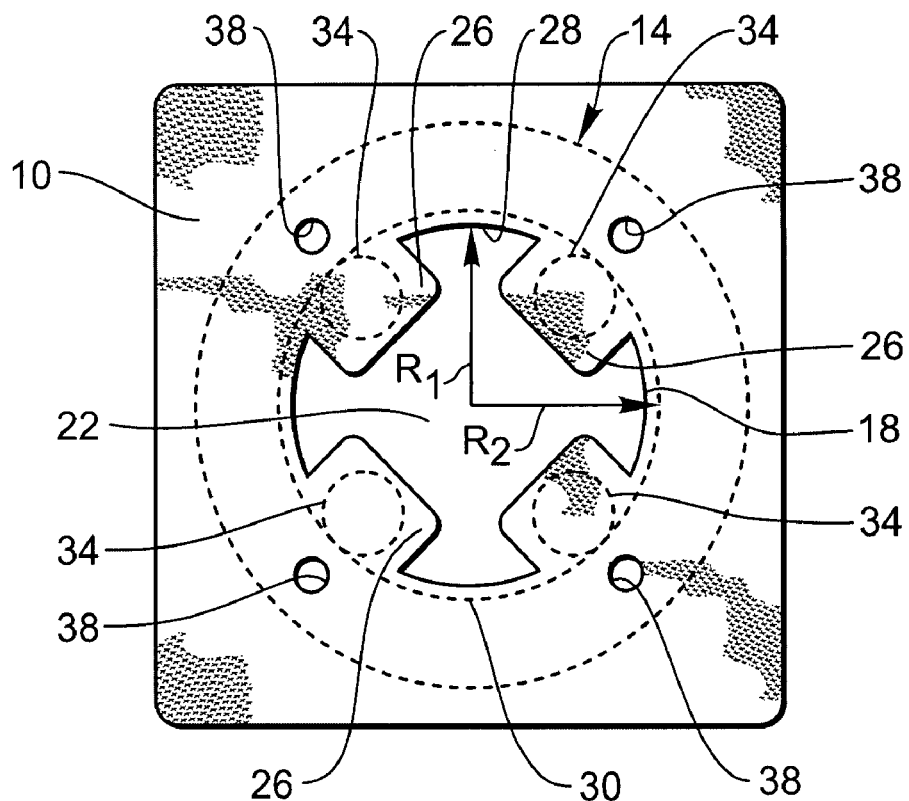
FIG. 1 is a perspective view of an airbag showing a hub portion that may be used in the present embodiments.

Referring now to FIG. 1, a perspective view illustrates an airbag 10 that may be used in a motor vehicle. The airbag 10 is designed as a frontal airbag, meaning that it may be installed as either a drivers' airbag or a passenger airbag.

The airbag 10 will also include a cushion inflator hub portion 14. This hub portion 14 is a portion or section of the airbag 10 that is designed to be attached/secured to the inflator (not shown in FIG. 1) and/or the airbag housing (not shown in FIG. 1). In other words, the hub portion 14 is the portion of the airbag 10 that facilitates attachment to the other portions of the airbag module. Those skilled in the art will appreciate how/where the hub portion 14 may be positioned on the airbag 10 to facilitate attachment.

The hub portion 14 includes an opening 18 proximate the center 22 of the hub portion 14. The opening 18 may be substantially circular in shape and is designed such that it will match (or be slightly larger than) the diameter of the inflator selected for use in the airbag module. However, in the embodiment of FIG. 1, the hub portion 14 includes one or more tab extensions 26 (or extensions 26) that extend inward into the opening 18. These extensions 26 are portions of the fabric of the airbag 10 that were not cut out in forming the opening 18. The tab extensions define at least a portion of the periphery 28 of the opening 18.

The extensions 26 shown in FIG. 1 are generally square or rectangular in shape to resemble tabs. However, other shapes for the extensions 26 are clearly possible. The size/dimensions of each of the extensions 26 may be equal or substantially equal, as shown in FIG. 1, or may be different, depending upon the particular embodiment.

In the embodiment shown in FIG. 1, the opening 18, as partially defined by the extensions 26, has an overall shape that resembles a modified formée cross. (In other words, the shape of the opening 18 shown in FIG. 1 is that of a modified formée cross). This shape is given as an example. Other shapes may also be possible, including a traditional, unmodified formée cross.

A stitchline 30 may also be added to the hub portion 14. The stitchline 30 is a sew or hem line that may operate to attach various layers of fabric together. The stitchline 30 may also be used to reinforce/strengthen the hub portion 14. During deployment of the airbag, a load is applied to the hub portion 14 which can operate to tear the airbag 10 or separate the airbag 10 from the inflator or other portions of the airbag module. Obviously, having the airbag 10 tear or separate from other portions of the airbag module during deployment is undesirable. Accordingly, to strengthen the airbag 10 at the hub portion 14, the stitchline 30 is added.

As shown in FIG. 1, the stitchline 30 is a circular sew line that surrounds or circumscribes the opening 18. Other configurations of the stitching are also possible. Further, the stitchline 30 may include one or more loops 34 (which may be circular) that are added to one or more of the extensions 26. In other words, a circular loop 34 may be on one or more of the extensions 26. Again, the purpose of the loops 34 is to strengthen the extensions 26 for the deployment process.

The hub portion 14 may further include one or more cushion fastening holes 38. These cushion fastening holes 38 are designed to receive a fastener (such as a screw, bolt, etc.). As is known in the art, fasteners are used to secure the airbag to a housing and/or inflator during the assembly process. Accordingly, the fasteners will pass through the cushion fastening holes 38 as a means of securing the airbag 10. A tab extension 26 may be positioned between each cushion fastening hole 38 and the opening 18. In other embodiments, at least one tab extension 26 may be positioned proximate each cushion fastening hole 38.

By adding the loops 34 and/or the extensions 26 to the airbag 10, advantages may be enjoyed. For example, the loops 34 and the extensions 26 increase the strength/robustness of the hub portion 14 and reduce the likelihood that fasteners (not shown in FIG. 1) that are passed through the cushion fastening holes 38 will rip or tear through the airbag 10 during deployment. (Obviously, having the fasteners rip or tear through the cushion fastening holes 38 is undesirable). Because the loops 34 and the extensions 26 increases strength/robustness of the hub portion 14, the number of fabric layers necessary to create the hub portion 14 may be reduced. Such a reduction in the amount of material used to create the hub portion 14 decreases both the cost in producing the airbag 10 and the overall weight of the airbag module.

It should also be noted that the addition of the extensions 26 to the hub portion 14 does not increase the production costs of the airbag 10. In conventional designs that do not include the extensions 26, the opening 18 is generally circular and is cut out completely. In order to add the extensions 26 to the hub portion 14, some of this material is simply not cut out—i.e., it is left as part of the hub portion 14. This remaining material is used to form the extensions 26. Thus, no additional material is needed to form the extensions 26.

In some current embodiments, the radius from the center 22 of the opening 18, as indicated by $R_1$, is 40.5 millimeters. Similarly, the radius between the center 22 of the opening 18 and the circumferential stitchline 30, as indicated by $R_2$, is 43.5 millimeters. Of course, such dimensions are given only as an example. Other sizes and dimensions are clearly possible. In fact, a ring of any particular size or shape may be used.

Figure 2:
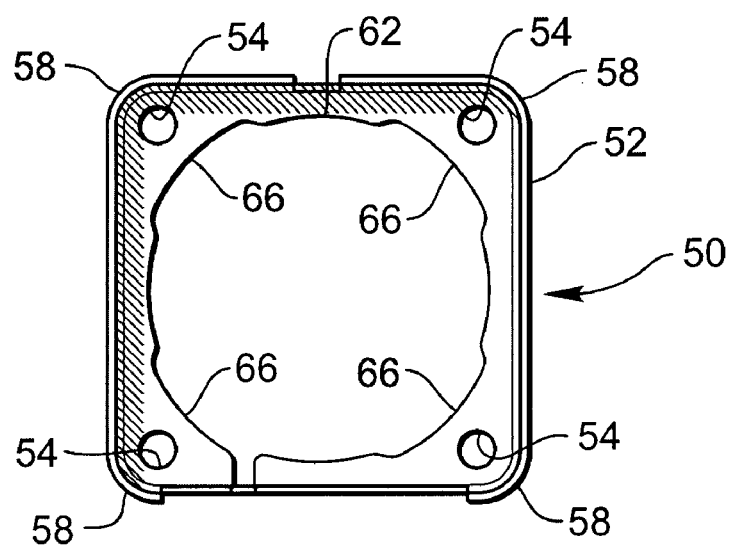
FIG. 2 is a perspective view of a retainer ring that may be used in the present embodiments.

Referring now to FIG. 2, a perspective view illustrates a retainer ring 50 according to the present embodiments. As is known in the art, a retainer ring is added to retain the airbag and retainer to the airbag housing. The retainer ring 50 of the present embodiments differs from that which is conventionally known.

The retainer ring 50 may be rectangular in shape. (As used herein, the term "rectangular" includes both rectangular shapes and square shapes). Other shapes for the retainer ring (including round or circular) may also be used. The retainer ring 50 may include a lip 52 and one or more fastener holes 54 that are designed to secure the retainer ring 50 to the airbag, the inflator, and/or other portions of the airbag module. The fastener holes 54 may be positioned proximate the corners 58 of the retainer ring 50. As shown in FIG. 2, proximate each of the corners 58 of the ring 50 is at least one fastener hole 54.

The retainer ring 50 includes a central aperture 62 that is sized to receive an inflator (not shown in FIG. 2). Specifically, the central aperture 62 is a hole or opening in the retainer ring 50 through which an inflator may be passed. Once the inflator has been passed through the central aperture 62, the retainer ring 50 operates to retain/hold the inflator and the airbag during deployment.

The retainer ring 50 further includes one or more relief cuts 66. The relief cuts 66 are cuts, incisions, or "cut-out" portions of the aperture 62 that make the aperture 62 have a larger diameter/size at the location of the cuts 66. In other embodiments, the cuts 66 may be slots or openings in the retainer ring 50 that are separate from (or connected to) the aperture 62. As will be explained in greater detail below, the cuts 66 are designed such that when the airbag module is fully assembled, the position of the cuts 66 corresponds to the position of the extensions 26 (shown in FIG. 1). The relief cuts 66 are designed and positioned to receive the extensions 26 if the extensions are properly bent 26. In the embodiment shown in FIG. 2, the relief cuts 66 are positioned proximate the holes 54 or proximate the corners 58.

Figure 3:
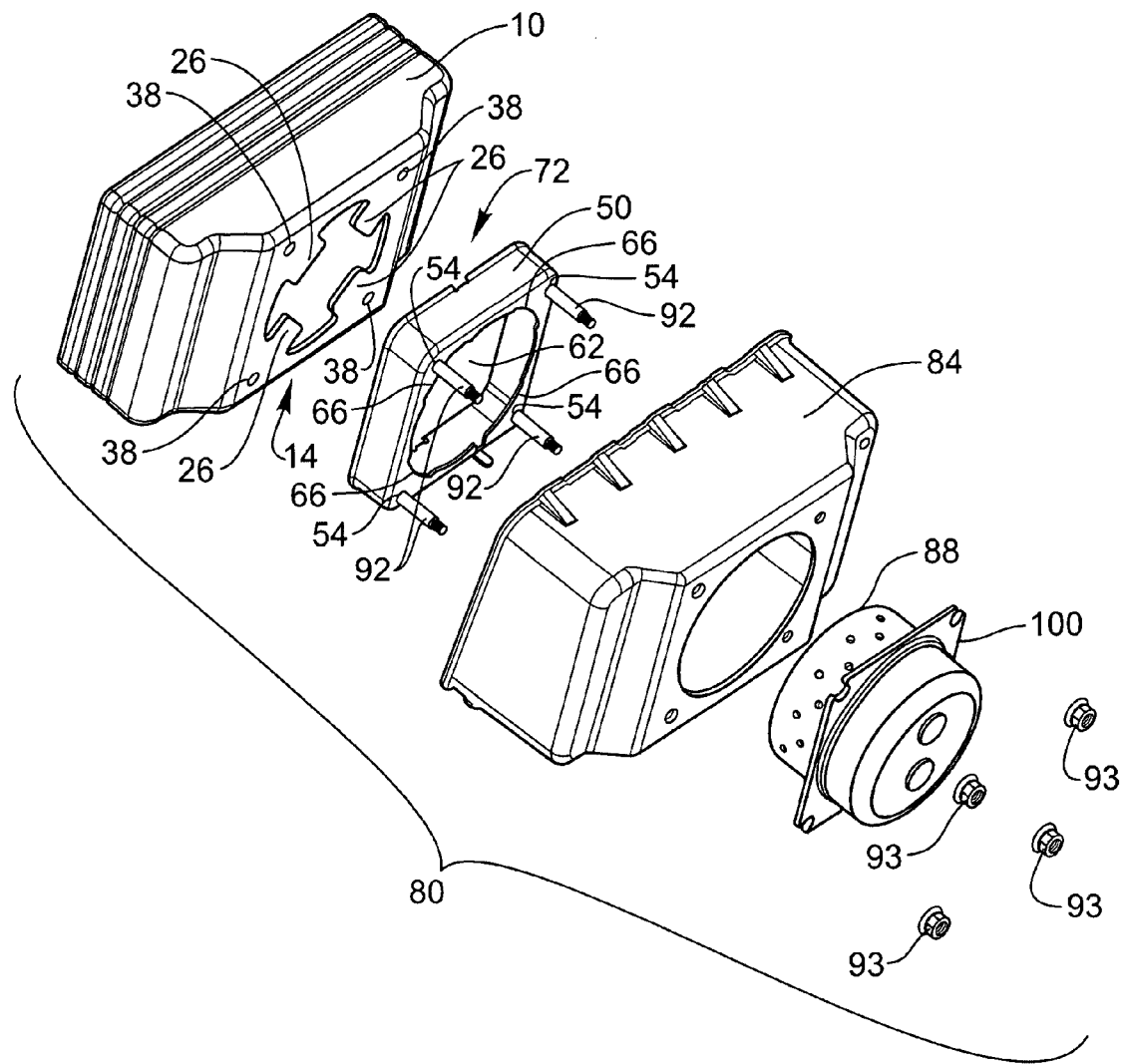
FIG. 3 is an assembly view of an airbag module according to the present embodiments that includes the airbag of FIG. 1 and the retainer ring of FIG. 2.

Referring now to FIG. 3, an assembly view illustrates an airbag module 80 according to the present embodiments. The airbag module 80 includes the retainer ring 50 of FIG. 2 as well as the airbag 10 of FIG. 1. Specifically, FIG. 3 shows a way in which the retainer ring 50 and the airbag 10 may be combined to create a new airbag module 80.

As shown in FIG. 2, the airbag module 80 includes an airbag housing 84 that is designed such that the airbag 10 may be positioned within the housing 84. All or a portion of an inflator 88 may also be positioned in the housing 84 (when fully assembled). The airbag module 80, including the housing 84, may be mounted into a motor vehicle. Fasteners 92 may be used to secure the airbag 10, the inflator 88 and the housing 84 together. Those of skill in the art will appreciate how to mount/attach the airbag module 80 to a vehicle.

The fasteners 92 are shown being passed through the holes 54 in the ring 50. It will be appreciated that the fasteners 92 may also be passed through the holes 38 in the airbag 10. Nuts 93 may engage the fasteners 92.

The inflator 88 has an inflator flange 100 that assists in mounting the inflator 88. Specifically, the inflator flange 100 includes one or more openings through which the fasteners 92 may pass. When positioned and secured in place, the inflator flange 100 will abut against a rear surface of the retainer ring 50.

The central aperture 62 of the retainer ring 50 is designed such that a portion of the inflator 88 may pass through the central aperture 62. Similarly, the opening 18 in the hub portion 14 is also designed such that, when the extensions 26 are folded, a portion of the inflator 88 may pass through the opening 18.

FIG. 3 also shows an attachment mechanism 72 according to the present embodiments. The attachment mechanism 72 comprises the retainer ring 50 and the cushion inflator hub portion 14 discussed above. When the ring 50 and the hub portion 14 are combined in the manner described herein, the resulting combination is a mechanism 72 by which an airbag may be attached to a vehicle/airbag module.

Figure 4:
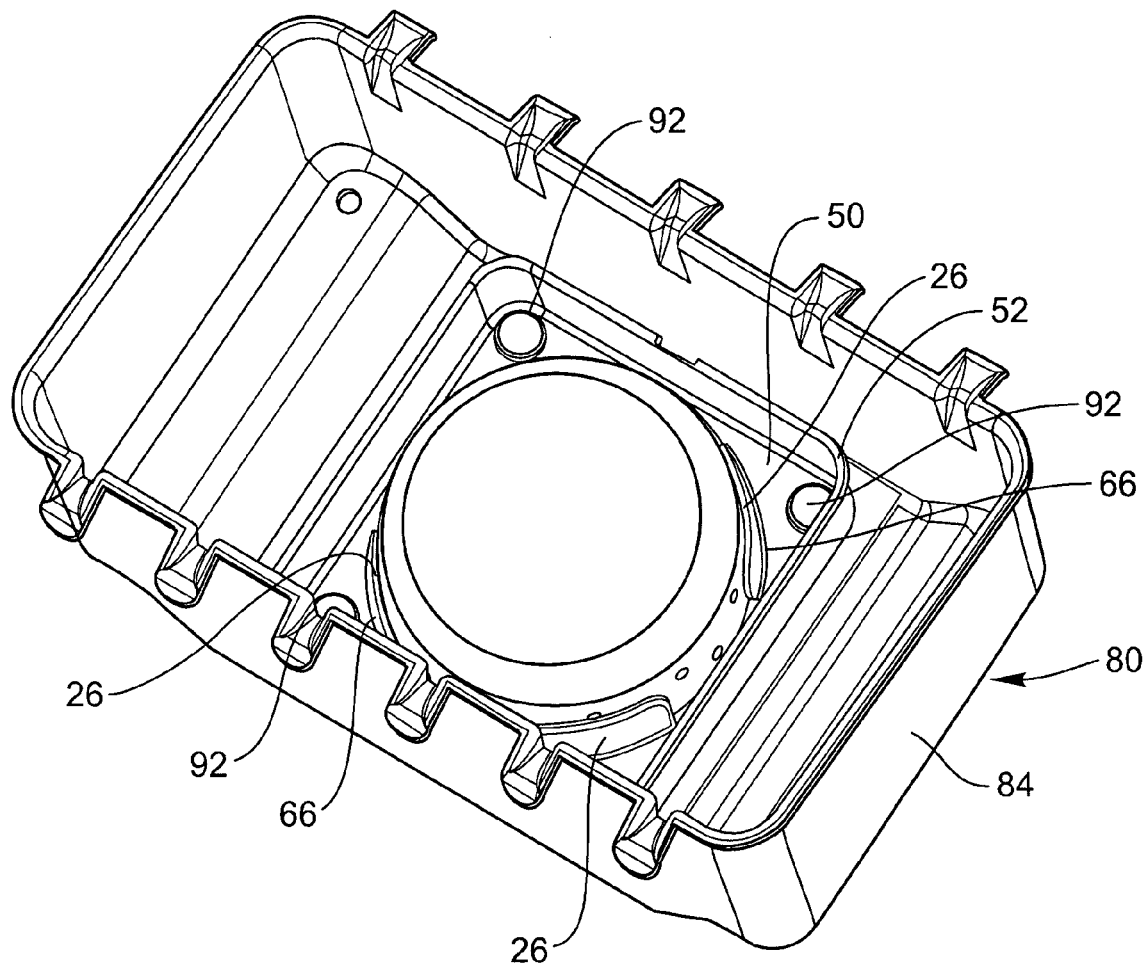
FIG. 4 is a perspective view that illustrates the airbag module of FIG. 3 fully assembled.

Referring now to FIG. 4, the airbag module 80 of FIG. 3 is illustrated in its fully assembled configuration. As can be seen in FIG. 4, the inflator 88 passes through the central aperture 62 and the opening 18. Similarly, the fasteners 92 pass through the fastener openings 54 and cushion fastening holes 38 respectively.

As can be seen in FIG. 4, the extensions 26 are bent such that they pass through the relief cuts 66. The relief cuts 66 in the ring 50 allow for this bending of the extensions 26 to occur easily. The extensions 26 are bent up alongside the body of the inflator 88. Such positioning of the extensions 26 is advantageous as it does not require/necessitate changes in the module components in order to complete the module assembly process.

Referring now to FIGS. 1-4 generally, it is noted that the airbag module 80 of the present embodiments may have specific advantages over previously known systems. For example, the positioning of the extensions 26 proximate the cushion fastening holes 38 means that there is more airbag/ fabric material proximate the cushion fastening holes 38. Similarly, the loops 34 and other stitchlines 30 are also positioned proximate the cushion fastening holes 38. These features increase the strength/robustness/reliability of the module 80 and reduce the likelihood that the fasteners 92 will rip or tear through the airbag 10 during deployment. Accordingly, the airbag module 80 is better suited to withstand the high loads associated with airbag deployment. Similarly, this improved robustness means that the fasteners 92 do not have to be tightened as "tight" as other modules, thereby reducing the assembly time and costs associated with manufacturing the airbag module 80.

Because the addition of the stitchlines 30, loops 34, and extensions 26 operate to prevent the fasteners 92 from ripping through the airbag 10 during deployment, the airbag module 80 may be more robust than other modules. Accordingly, the airbag module 80 may incorporate compressible housing materials, such as plastic or other materials, without adversely affecting performance or operability. In a similar manner, lighter weight plastics or other materials may be used for the retainer ring 50 without adversely affecting performance or operability. Thus, the overall cost and weight of the airbag module 80 may be reduced.

Similarly, the present embodiments also provide a method for reinforcing an airbag module 80 with reduced torque on the fasteners 92, the method comprising the step of obtaining an inflator 88 and an airbag 10 housed within an airbag housing 84. As explained above, the airbag 10 comprises a cushion inflator hub portion 14 that includes one or more tab extensions 26 and an opening 18. The tab extensions operate to define at least a portion of the periphery 28 of the opening 18. The method also includes the step of obtaining a retainer ring 50. As noted above, the retainer ring 50 has a central aperture 62. The retainer ring 50 also comprises one or more relief cuts 66. The method additionally includes the step of bending the tab extensions 26 such that the tab extensions 26 pass through the relief cuts 66. Of course, in other embodiments of the method, the hub portion 14 further comprises a stitchline 30 that circumscribes the opening 18. In yet additional embodiments, the stitchline 30 includes a circular loop 34 on one or more of the tab extensions 26. Other embodiments of the present method are also possible.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag module with an inflator comprising:
    an airbag housed within a housing, the airbag comprising a cushion inflator hub portion, wherein the cushion inflator hub portion comprises an opening, one or more tab extensions extending from the edge of the opening toward the center of the opening, and one or more cushion fastening holes, the one or more cushion fastening holes being located external to the one or more tab extensions and the opening, the tab extensions defining at least a portion of the periphery of the opening and at least one of the tab extensions being positioned between one of the cushion fastening holes and the opening and at least one of the tab extensions having a reinforcing stitchline thereon; and
    a retainer ring comprising an aperture through which the inflator may be passed and one or more relief cuts positioned to receive the tab extensions, wherein the tab extensions are bent to pass through the one or more relief cuts of the retainer ring while the at least one of the cushion fastening holes does not pass through the aperture of the retainer ring.

2. An airbag module as in claim 1 wherein the opening is sized so that, when the extensions are bent, an inflator may be passed through the opening.

3. An airbag module as in claim 1 further comprising a stitchline that circumscribes the opening between at least one of the cushion fastening holes and the opening.

4. An airbag module as in claim 1 wherein the reinforcing stitchline further comprises a circular loop on one or more of the tab extensions.

5. An airbag module as in claim 1 wherein the retainer ring has a generally rectangular shape and a fastener hole proximate each of the corners of the retainer ring.

6. An airbag module as in claim 1 wherein each tab extension is positioned proximate one of the cushion fastening holes.

7. An airbag module as in claim 1 wherein the opening has the shape of a modified formée cross.

8. An attachment mechanism for an airbag comprising:
    a cushion inflator hub portion, wherein the cushion inflator hub portion comprises an opening, one or more tab extensions extending from the edge of the opening toward the center of the opening and one or more cushion fastening holes, the one or more cushion fastening holes being located external to the one or more tab extensions and the opening, the tab extensions defining at least a portion of the periphery of the opening and at least one of the tab extensions being positioned between one of the cushion fastening holes and the opening and at least one of the tab extensions having a reinforcing stitchline thereon; and
    a retainer ring having an aperture, the retainer ring comprises one or more relief cuts positioned on the periphery of the aperture to receive the tab extensions when the tab extensions are bent to pass through the relief cuts.

9. An attachment mechanism as in claim 8 wherein the opening has the shape of a modified formée cross.

10. An attachment mechanism as in claim 8 further comprising a stitchline that circumscribes the opening between at least one of the cushion fastening holes and the opening.

11. An airbag module as in claim 8 further comprising a reinforcing stitchline that includes a circular loop on one or more of the tab extensions.

12. A method for reinforcing an airbag module with reduced torque on the fasteners, the method comprising:
    obtaining an inflator and an airbag housed within a housing, the airbag comprising a cushion inflator hub portion, wherein the cushion inflator hub portion comprises an opening, one or more tab extensions extending from the edge of the opening toward the center of the opening, and one or more cushion fastening holes, the one or more cushion fastening holes being located external to the one or more tab extensions and the opening, the tab extensions defining at least a portion of the periphery of the opening and at least one of the tab extensions being positioned between one of the cushion fastening holes and the opening;

applying a reinforcing stitchline to at least one of the tab extensions;

obtaining a retainer ring, the retainer ring having an aperture, wherein the retainer ring comprises one or more relief cuts; and bending the tab extensions such that the tab extensions pass through the relief cuts.

13. A method as in claim 12 further comprising the step of sewing a stitchline that circumscribes the opening between at least one of the cushion fastening holes and the opening.

14. A method as in claim 12 further comprising the step of sewing the reinforcing stitchline into a circular loop on one or more of the tab extensions.

* * * * *